US006445780B1

(12) United States Patent
Rosset et al.

(10) Patent No.: US 6,445,780 B1
(45) Date of Patent: Sep. 3, 2002

(54) METHOD AND SYSTEM FOR ENSURING THE SECURITY OF TELEPHONE CALL MANAGEMENT CENTERS

(75) Inventors: Franck Rosset, Paris; Alain Gayet, Courbevoie; Jean Moulin, Draveil, all of (FR)

(73) Assignee: Fintel S.A., Paris (FR)

( * ) Notice: Subject to any disclaimer, the term of this patent is extended or adjusted under 35 U.S.C. 154(b) by 0 days.

(21) Appl. No.: 09/269,312

(22) PCT Filed: Sep. 25, 1997

(86) PCT No.: PCT/FR97/01684

§ 371 (c)(1),
(2), (4) Date: May 3, 1999

(87) PCT Pub. No.: WO98/13991

PCT Pub. Date: Apr. 2, 1998

(30) Foreign Application Priority Data

Sep. 25, 1996 (FR) .............................................. 96 11913

(51) Int. Cl.[7] .............................................. H04M 15/00
(52) U.S. Cl. ..................... 379/114.17; 902/26; 235/379
(58) Field of Search ........................... 379/93.15, 93.17, 379/93.02, 114.01, 114.15, 114.17, 114.19, 114.2, 144.04, 444; 902/25, 26

(56) References Cited

U.S. PATENT DOCUMENTS

| 4,707,592 A | 11/1987 | Ware |
| 4,928,098 A | 5/1990 | Dannhaeuser |
| 4,998,279 A | 3/1991 | Weiss |

FOREIGN PATENT DOCUMENTS

| CA | 2 085 775 A | 6/1994 |
| DE | 43 25 459 | 2/1995 |

(List continued on next page.)

OTHER PUBLICATIONS

"Calling Card Service—Overall Description and operational Characteristics" Colfane D.E. et al. Bell System Technical Journal, vol. 61, No. 7, Pt. 3. Sep. 1982, pp. 16655–1673.

"Calling card service—TSPS hardware, software and signalling implementation" Bell System Technical Journal, vol. 61, No. 7, Pt. 3, Sep. 1982, pp. 1675–1714.

International Search Report for PCT/FR97/01684.

Chung, Edward C. and Celenk, M., 'Implementation of a Fax Distribution System in the Local Area Networks of PCs', (periodical unknown), (1992), pp. 964–968.

*Primary Examiner*—Creighton Smith

(57) ABSTRACT

The invention concerns a method an a system enabling a centre managing telephone calls (30) to different suppliers of services (40), to identify safely and rapidly the customers (11) of the service suppliers calling the management centre by means of a telephone equipment (16) connected to a communication network (15). The method comprises the following steps: the services (41) of the service suppliers (40) and/or the call management centre (30) provide each customer (11) with a personalised card (10), formatted like a credit card; said card (10) emits brief identifying sound signals, of the DMTF type, at least partly encrypted, varying with each operation, when it is actuated (14) by the customer; said identifying sound signals are received by the microphone(17) of the telephone equipment (16) and converted into electronic signals, before being transmitted by the communication network (15) to the computer service (18) of the call management centre (30); the transmitted signals and the identification data of the customer and the card in the possession of the computer service are electronically processed (24) and compared (25) by the computer service (18) of the call management centre (30), such that in the event of coincidence, the customer is immediately put through to the services of the service supplier affiliated to the call management centre.

8 Claims, 2 Drawing Sheets

FOREIGN PATENT DOCUMENTS

Figure 1:
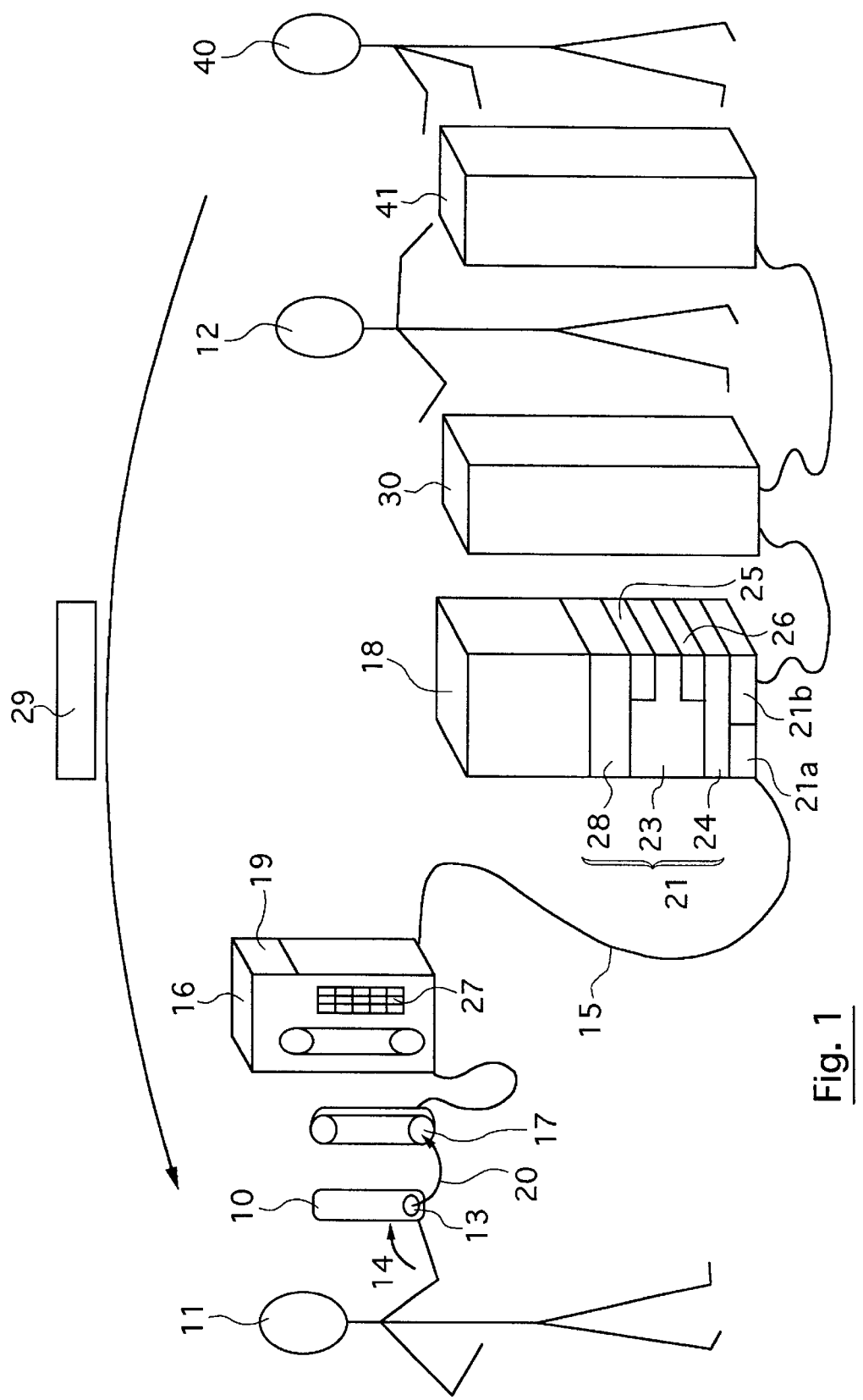

| | | |
|---|---|---|
| EP | 0 360 732 | 3/1990 |
| EP | 0 374 012 | 6/1990 |
| EP | 0 423 035 | 4/1991 |
| EP | 0 459 781 | 12/1991 |
| EP | 0 609 143 | 8/1994 |
| EP | 0 695 076 | 1/1996 |
| FR | 63-211843 | 9/1988 |
| FR | 2 701 181 | 8/1994 |
| GB | 2 274 523 | 7/1994 |
| WO | WO 82 04169 | 11/1982 |
| WO | WO 88 03294 | 5/1988 |
| WO | WO 96 04741 | 2/1996 |
| WO | WO 96 31971 | 10/1996 |
| WO | WO 97 03421 | 1/1997 |
| WO | WO 97 12471 | 4/1997 |

METHOD AND SYSTEM FOR ENSURING THE SECURITY OF TELEPHONE CALL MANAGEMENT CENTERS

The domain of this invention is remote services.

More precisely, the invention relates to a method and a system by which a telephone call control center, to which separate service providers are related, quickly and reliably identifies the service providers's customers calling the call control center through telephone equipment (or any terminal emulating this function) connected to a communications network. Many companies offer after sales (or before sales) technical assistance to their customers from their homes or sites on which their customers use the products or software that they sell. Other companies (transporter, shows, travel agents, etc.), setup remote reservation services. More and more products (remote purchase) or services (advice, financial information, etc.) may be purchased and occasionally delivered using the telephone communication network. These companies often appoint call control centers to manage and/or reroute telephone calls concerning them.

The problem that arises is to prevent a dishonest user from accessing the call control center without being authorized to do so, without paying the corresponding costs, or from claiming that he did not request the services that were debited to him by the call control center or directly by services from related service providers.

To solve this problem it has been proposed to use access keys generated by the customer using a multimedia terminal or peripheral equipment. Apart from their costs, these solutions are not very practical and take a long time to set up. The problem that arises can only really be solved if a solution is known to another problem —how to design a method and system that is convenient to use and that can be quickly and economically installed. Ease of use and time savings are major problems for any product aimed at the general public, and cannot be ignored.

It has been proposed (document WO 96 04741 in the name of Andrew MARK) to use a card emitting DTMF type encrypted acoustic signals. Thus, the holder of a card of this type can couple it to the microphone in the telephone handset to automatically transfer his identifiers to the computer services. Since these identifiers are encrypted, it may be thought that a third party will be incapable of understanding the contents. However, there is nothing to stop the signals emitted by the card from being recorded, and a defrauder in possession of this type of recording could substitute himself for the card holder.

Therefore the solution proposed by A. MARK, transposed to the case of a telephone call control center, in order to quickly and securely identify customers of service providers related to this call control center, would not prevent a dishonest user from accessing services offered by the call control center or by related service providers without authorization.

The objectives of this invention are achieved, and the problems that arise with techniques according to prior art are solved according to the invention by means of a method comprising the following steps:

the services offered by service providers and/or the call control center provide each of their customers with a card, the same size as a credit card, customized by identifiers specific to each customer and to each card, the said card emits short acoustic DTMF type identification signals, at least partly encrypted and varying for each operation, when the customer uses it, the said acoustic identification signals are received by the microphone in the telephone equipment (and any terminal emulating this function) and are converted to electronic signals before being transmitted through the communications network to the call control center's computer service, the transmitted signals and the customer and card identification data stored by the computer service are processed and electronically compared by the call control center's computer service.

Thus with this method, the call control center can verify that the caller actually has an authentic card and not a computer artifice. He can also identify the card holder as being a person authorized to use the services offered by related service providers. Consequently if the results are conform, the customer is immediately connected to the voice server or the receptionist of the call control center and/or the service provider expected by the customer. Furthermore, defrauders cannot determine identification data since they were automatically transmitted in encrypted form. Furthermore, with the recorded acoustic signals in any form whatsoever, a defrauder will be unable to identify himself to the call control center and benefit from its services. The acoustic identification signals are different for each operation, in other words every time that the card is used.

Preferably the said card:

also counts the number of times $C(p,n)$ that it is used, emits acoustic signals representing the number of times $C(p,n)$ that it has been used, encrypts acoustic signals as a function of the number of times $C(p,n)$ that it has been used.

Also preferably, the said computer means for processing and electronically comparing the transmitted signals and the customer and card identification data held by the call control center's computer service, store the number of times $C(p,m)$ that the card has been used at the time of the last validated operation, compare the number of times $C(p,n)$ that the card has been used at the time of the current operation, with the memorized number of times $C(p,m)$, refuse the current operation if $C(p,n)$ is less than or equal to $C(p,m)$ and continue verifying the current operation if $C(p,n)$ is greater than $C(p,m)$, recalculate electronic signals $S'(p,n)$ as a function of identification data and the number of times $C(p,n)$ that the card was used, during the current operation, and then compare them with the transmitted electronic signals $S(p,n)$. If the values agree, the customer may then immediately be connected to the services offered by the service provider related to the call control center.

In other words, the value $C(p,n)$ is the number of times the card has been activated, while the value $C(p,m)$ is the number of times the card had been activated as of the last successful validation.

It is emphasized that activation of the card and validation of the card are two different events. Activation is executed by the card; validation also involves the computer system.

Although activation of the card is necessary to initiate the validation process (validation cannot occur without activation), it is possible to activate the card without performing validation. For example, the activation button (if present) may be pressed accidentally, the validation process may fail due to technical difficulties, etc.

Each time the card is activated, $C(p,n)$ increments, whether or not the card is in communication with the computer means (that is, whether or not validation is even possible). Each time an attempt is made to validate the card, C(p,n) is compared to C(p,m). When the card is successfully validated, C(p,m) is reset to correspond with C(p,n).

Because activation may take place without validation, C(p,n) may increment without C(p,m) changing. However, because C(p,m) only changes upon a successful validation (at which time it is reset to correspond with C(p,n)), C(p,m) cannot be greater than C(p,n).

Any attempt at validation using a value of C(p,n) that is not greater than that of C(p,m) is considered fraudulent, and is denied.

In order to increase security of the method, in one variant embodiment, the method also comprises a step in which the customer uses a keypad associated with the microphone and/or the card to send a pin code. After transmission to the call control center's computer service through the communications network, this pin code is processed and compared with the customer's pin code held by the call control center's computer service.

Thus the call control center can check that the caller is actually the person authorized to be connected to the service provider(s) related to the call control center. A stolen card cannot be used by the thief, since he does not know the pin code.

In another variant embodiment also designed to increase security of the method and to make it impossible for the customer to dispute the order that he made directly (or indirectly through the call control center) to the service provider, the method also includes the following steps:

orders given by the customer to the services offered by the service provider are validated by the customer by using the card so that it sends an encrypted acoustic validation signal, the computer service or the services offered by the service provider record the said validation signal.

Advantageously, the method according to the invention may include the following step:

an acknowledgment of the validation signal is sent to the customer.

With this method, the customer used an electronic signature to validate the order that he gave to the service provider and his account may be debited or credited.

The invention also relates to a system enabling a telephone call control center to which separate service providers are related, to quickly and reliably identify customers of service providers calling using telephone equipment (or any terminal emulating this function) connected to the communications network. This system is capable of understanding the means of implementing the method described above and its variant embodiments. More particularly:

The system according to the invention comprises a card, the same size as a credit card, customized by specific identifiers for each card and for each customer, provided by the call control center or the services offered by the service provider. The card comprises means of emitting short acoustic identification signals of the DTMF type. These acoustic signals are emitted when the customer controls the emission means using an element (particularly a button) accessible from the outside of the card.

The card also comprises encryption means in order to encrypt at least part of the acoustic signals, and to vary them whenever the card is activated by the button.

The system according to the invention comprises a telephone equipment (or any terminal emulating this function) comprising a microphone used to receive acoustic signals, and to transform them into electronic signals that can be transmitted through the communications network.

The system according to the invention also comprises computer means dependent on the call control center and/or services of the service provider's computer services connected to the communications network.

The said computer means comprise:
a database containing the references of the cards and customers and their identification data,
processing means and means of comparing the electronic signals and identification data contained in the database.

Thus with this system, the call control center can verify that the caller has actually an authentic card and not a computer artifice. Furthermore, the call control center can also identify the card holder as a person authorized to use the services offered by related service providers. Consequently if the card is conform, the customer will immediately be connected to the voice server or the receptionist of the call control center and/or the service provider expected by the customer. Furthermore, defrauders will not be able to identify identification data since they are automatically transmitted in encrypted form. Furthermore, a defrauder will not be able to identify himself to the call control center and benefit from its services using a recording of the acoustic signals in any form whatsoever. Acoustic identification signals vary during each operation, in other words every time that the card is used.

Preferably, the said card also includes:
an incremental counter interconnected to emission means and encryption means that is incremented by at least one unit every time that the card is used.

Consequently, the state of the incremental counter is sent to the computer means and acoustic signals are encrypted as a function of the state of the incremental counter.

Preferably, the said computer means also comprise:
means of memorizing the state C(p,m) of the incremental counter at the time of the last validated operation,
means for comparing the state C(p,n) of the incremental counter emitted during the current operation with the state C(p,m) of the memorized incremental counter.

Consequently, the check on the current operation is refused if C(p,n) is less than or equal to C(p,m) and is continued if C(p,n) is greater than C(p,m).

Also preferably, the said processing means and the said means of comparison of the electronic signals and identification data contained in the database include means of recalculating the electronic signals as a function of the state C(p,n) of the incremental counter and the identification data, and then comparing them with the transmitted electronic signals. Consequently if agreement is found, the customer can immediately be connected to the services of the service provider related to the call control center.

In one variant embodiment designed to increase the security of the system, the computer means also comprise second means of comparing a customer's pin code stored in the database, with a pin code input by the customer, by means of a keypad associated with the telephone equipment (or any terminal emulating this function) and/or the card, and is transmitted to the call control center's computer means, through the communications network.

Thus, the telecommunications operator can verify that the caller is actually the person authorized to access its services. A thief cannot use a stolen card because he does not know the pin code.

In another variant embodiment, also designed to increase the security of the system and to make it impossible for the customer to dispute an order that he gave to the telecommunications operator, the system according to the invention is such that:

when the customer activates the said card, it emits an encrypted acoustic signal to validate orders given by the customer, the call control center or services of the service provider also include means of detecting and recording the validation signal.

With this system, the customer validated the order that he made to the telecommunications operator with an electronic signature, so that his account may be debited without the possibility of a dispute.

Advantageously, in this case the means of detecting and recording the validation signal also include means of printing an acknowledgment of orders made, addressed to the customer.

Figure 2:
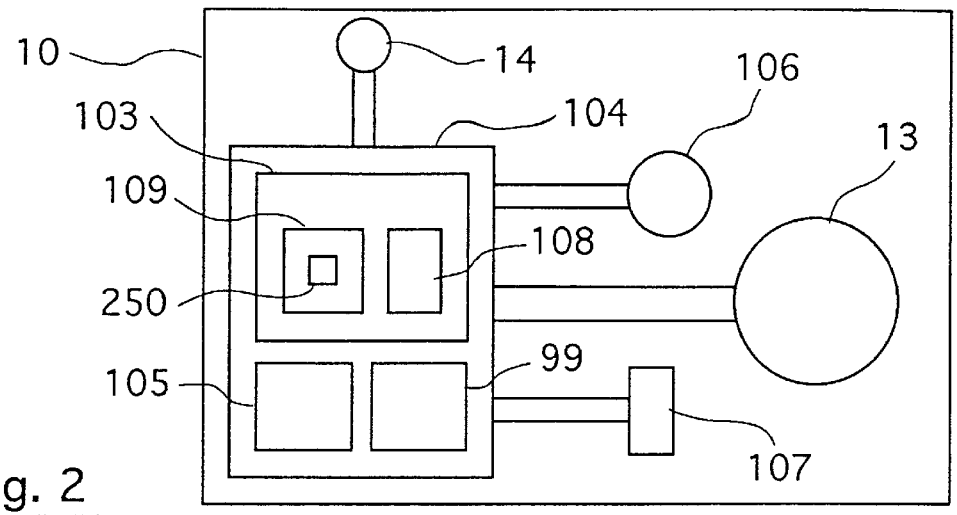
Figure 3:
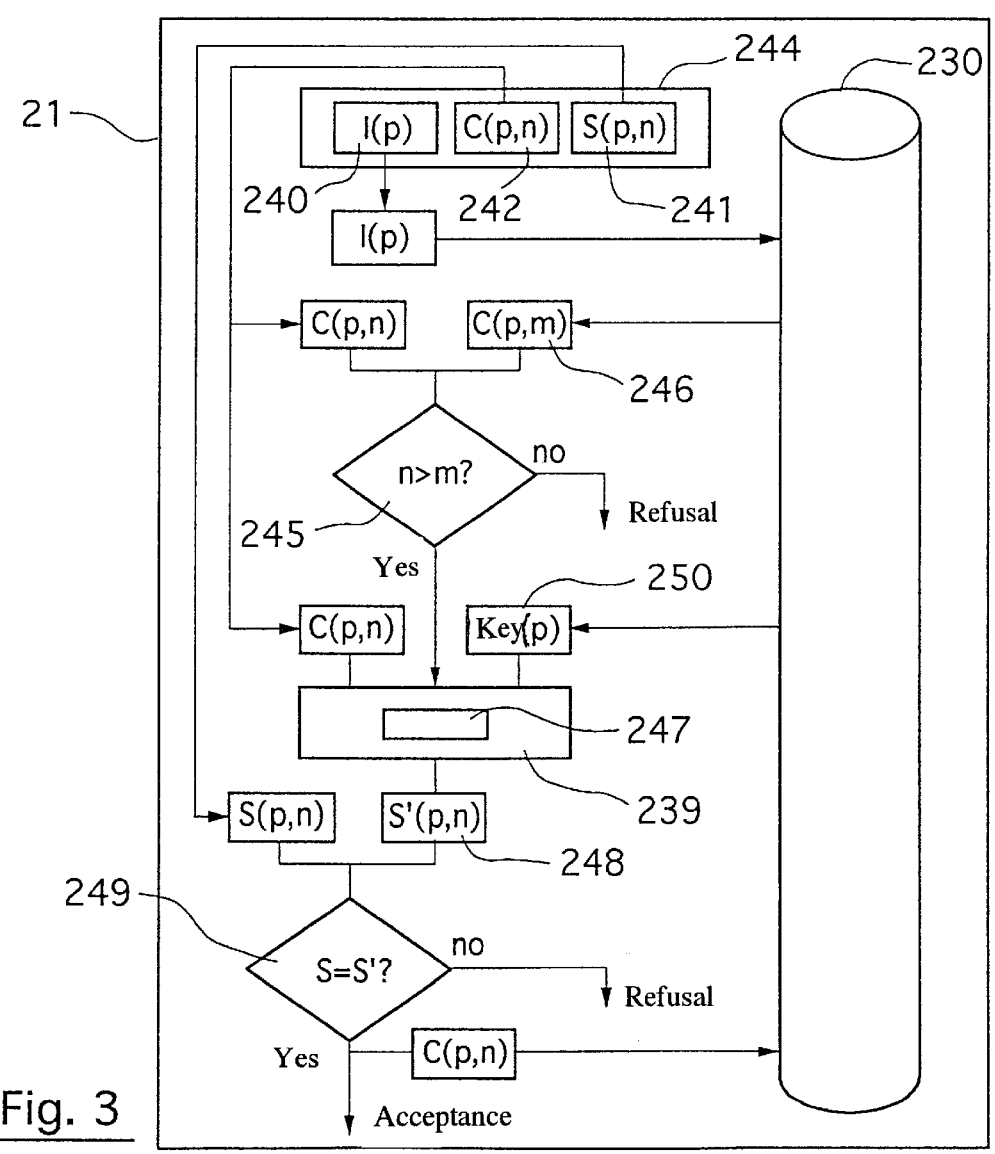

Other characteristics and advantages of the invention will become clear by reading the description of variant embodiments of the invention given for guidance and in no way restrictive, and:

FIG. 1 showing a perspective diagrammatic view of the system and method according to the invention, FIG. 2 showing the card in the form of a block diagram, FIG. 3 showing the algorithm used to verify the authenticity of the transmitted signal.

The system and method according to the invention enable the customer 11, using a telephone handset 16 comprising a microphone 17 to quickly and reliably call services offered by the call control center 30 that its operators 12 provide to customers 11 of service providers 40. The telephone handset 16, remote from the call control center's computer services 18 is connected to the computer services 18 through a communications network 15.

The system comprises a card 10, the same size as a credit card, customized by specific identifiers for each card and for each customer 11. This card is provided to customers 11 by the call control center 30 or services 41 offered by service providers 40.

The card 10 comprises emission means, particularly a loudspeaker 13 emitting short DTMF type acoustic identification signals 20. These signals are emitted when the customer uses a button 14 accessible from the outside of the card (not shown in FIG. 1 since it is on the other side of the card) to activate emission means 13 and the devices controlling them. These emission means 13 are excited by a DTMF signal generator 99 controlled by a microprocessor 104 powered by a battery 106 and controlled by a resonator 107. The microprocessor 104 contained in the card comprises encryption means 103 used to at least partly encrypt the acoustic signals comprising an encryption algorithm 108 and specific identifiers 109 for each card 10 and for each customer 11, and particularly the secret key 250 used by the encryption algorithm 108.

The acoustic signals 20 are received by the microphone 17 on the telephone handset, against which the customer presses card 10. The system also comprises transmission means 19 for sending acoustic signals 20 located in the telephone handset 16. These transmission means 19 send acoustic signals to the remote site after processing, and conversion into electronic signals through the communications network 15. The system also comprises computer means 21 dependent on the call control center's computer services 18. These computer means are connected to the communications network 15 and are remote from the telephone handsets 16.

These computer means 21 themselves comprise:
a database 23 containing the references of the cards and customers and their identification data,
processing means 24 and means 25 for comparing electronic signals and identification data contained in the database.

Consequently, if the request is conform, the call control center's services 30 and then services 41 offered by related service providers 40 are immediately accessible to the customer 11.

Preferably, the microprocessor 104 and the encryption means 103 are designed such that the acoustic signal 20 varies with each operation. Encrypting an identification code means transforming it into a series of items of information which are incomprehensible individually and can only be decrypted by the person holding the encryption key. But this can in no way prevents a copy being made of the encrypted identification code either during its acoustic transmission (recorder) or by the pirating from telephone line. If this copy is improperly used by a defrauder, the receiving system will treat it as having all the characteristics of the original, and it will then be interpreted in order to verify the identifiers of the card.

Therefore the problem that arises is how can any reproduction attempt be made impossible? The following describes several variant embodiments to the general means that is used to make a distinction between the original and the copy when analyzing the encrypted signal received by the computer means 21, by inserting a distinctive element in the DTMF type signal 20 emitted by the card 10.

One of the variants consists of using a "time-dating" function (for example as described in U.S. Pat. No. 4, 998, 279). This time-dating function uses the "time" parameter that changes continuously. Thus the "copy" is delayed when it is emitted. This type of solution requires that the emission means 13 and the computer means 21 are synchronized. In order to do this, both must have a "time base" and "frequency standard". These two time bases have their own precision and their own drift. The result is that they slowly but gradually become desynchronized. In order to overcome this technical difficulty, a certain amount of drift is tolerated between the time bases of the emission means 13 and the computer means 21. As this drift increases, the uncertainty about the "validity" of the information received and the risk of fraud also increases. Thus, if a drift of one minute is tolerated, the analysis system in the computer means 21 will consider that an illegal copy of the encrypted signal emission is valid if it is reused fraudulently within the next 30 seconds.

Another variant consists of using incremental lists (for example as described in U.S. Pat. No. 4,928,098). The emission device and the reception device have an ordered list of the successive encryptions of the identification code, or have algorithms that can be used to prepare them as time goes on. At a given instant, computer means 21 are waiting for the encrypted result C(n). If they actually receive the message C(n), it validates the operation. But the computer means 21 may receive a different message, the card user may have activated the card's emission means 13 several times, possibly by playing with it or perhaps accidentally, so that the card is in the situation that it emits the encrypted result C(n+p) the next time that it is used with the computer means 21. If the computer means 21 receive a different message, they will search forwards in the list of successive encrypted results to see if there was a message C(n+p) identical to the received message. One way of removing the ambiguity between "is this an authentic message emitted by the emitter?" or "is it a fraudulent message?" is to request the next emission, or wait for it. If the next emission is identical to C(n+p+1), the system validates the message and puts itself in waiting for the next emission in state C(n+p+2). If it is different, the message is not validated and the analysis system remains in waiting for message C(n). This variant embodiment is not very ergonomic since it obliges the card holder to activate the card several times.

According to one preferred variant embodiment for distinguishing the original signal from its copy, the onboard microprocessor 104 in card 10 comprises an incremental counter 105. The incremental counter 105 is incremented by one or several units each time the card is used. Obviously, like a ratchet, it cannot go backwards, and simply move forwards every time it is used.

In the case of this variant embodiment, the state C(p,n) 242 of the counter 105 is used in the calculation of the encrypted message 244 sent by emission means 13. The algorithm 108 (for which the equivalent algorithm 247 is memorized in the computer means 21) calculates the encoded part S(p,n) 241, using the secret key 250 specific to each card and the state C(p,n) 242 of the counter 105. In addition to the identification number I(p) 240 of the card and the encrypted identification code S(p,n) 241, the card 10 emits the state C(p,n) 242 of its incremental counter 105 during each emission. The computer means 21 memorize 230 the state C(p,n) 242 of the incremental counter 105 during the last validated operation, in the database 23. Thus each time a message 244 is received, the comparison means 25 in the computer means 21 can compare 245 the information received about the state C(p,n) 242 of the counter 105, with the previous information received C(p,m) 246 stored in memory 230, 23.

a) If the state C(p,n) 242 of the counter 105 (FIG. 2) expressed in message 244 is greater than the previously received state C(p,m) 246 (n>m), then the message 244 is accepted and the analysis continues.

b) If the state C(p,n) 242 of the counter 105 expressed in message 244 is less than or equal to the previously received state C(p,n) 246 (n_m), then the message will be refused. The received message can only be a copy made previously or a computer artifice.

If the conditions described in item a) above are satisfied, the computer means 21 can be used to read the fixed part I(p) 240 and to search for the corresponding secret key for the card in their own database 23, 230. The calculation means 239 in the processing means 24 may then calculate the encrypted code expected by the computer means 247, the state of the counter C(p,n) 242 and the secret key (p) 250. The comparison means 25 then compare the encrypted code S'(p,n) 248 thus calculated 249 with the encrypted code actually received S(p,n) 241. Therefore this method and these means can validate or invalidate message 244, without the need for the card user to activate the card several times as is case in the variant embodiment described above.

The existence of an incremental counter 105 in card 10 can define the maximum number of times that the card can be used when the card is being individually programmed, at no additional cost. Once this maximum has been reached, the card will no longer emit a consistent message and is therefore refused by the computer means 21.

The emitted frame 244 contains the following for a given card (p), a fixed part I(p) 240 (the card identification number), a variable incremental part C(p,n) 242 (the state of the counter), a variable part S(p,n) 241 which is apparently random (the result of an encryption algorithm 108 on the secret key 250 specific to this card (p)).

The frame emitted:

is always different on each different card, for the same card, is always different on each emission.

For a given card (p), the computer means 21 can:

read the fixed part I(p) 240 (the card identification number), search in their own database 23 for the secret key 250 of this card and the last record received of the state C(p,m) 246 of the counter 105 on this card, refuse this frame 244 if the state of the counter C(p,n) 242 for the current operation is less than or equal to the previously received state C(p,m) 246, and continue the verification of the current operation if the state C(p,n) 242 is greater than the previously received state C(p,m) 246, decrypt the received message 244 and validate its contents, by recalculating the specific key 250 for this card using the encryption algorithm 247 and the state of the counter C(p,n) 242 and then comparing the result of the calculation with the received message.

Thus using this combination of means, it is possible to emit DTMF type acoustic identification frequencies using a card the same size as a credit card, the frequencies being received by the microphone in equipment connected to the telephone network and being certain of the authenticity of the calling card and thus eliminate the possibility of any defrauder using a sound or computer record or a computer artifice.

In order to increase the security of the system in the variant embodiment shown in FIG. 1, computer means 21 also comprise second comparison means 26. These comparison means are used to compare a pin code for the customer contained in the database with the pin code emitted by the user. This code is emitted using a keypad 27 associated with the telephone handset 16 and/or the card 10 and transmitted to the computer means 21 belonging to the telecommunications operator through the communications network 15.

Thus, the call control center operators and service providers are assured that the caller 11 is actually the person authorized to get into contact with the services of related service providers. A thief cannot use a stolen card because he does not know the pin code.

In another variant embodiment, also designed to increase the security of the system and to prevent the customer from disputing the order that he gave to the service provider (directly or indirectly through the call control center), the system according to the invention is such that:

when the card 10 is activated 14 by the customer, it emits an encrypted acoustic signal validating the orders given by the customer 11, the said computer means 21 comprise means of detecting 21*a* and recording 21*b* the validation signal.

With this system, the customer enters an electronic signature to validate the order that he gave to the service provider and he can be billed without the possibility of a dispute.

Advantageously in this case, the computer means 21 also comprise means 28 of printing an acknowledgment 29 of the given orders. This acknowledgment is addressed to the customer 11.

We claim:

1. Method enabling a telephone call control center to which services offered by separate service providers are related, to securely and quickly identify the service provider's customers calling the call control center through telephone equipment connected to a communications network, the method comprising the following steps:

providing customers with a card the same size as a credit card, said card being customized by identifiers specific to each customer, and to each card, wherein said card counts a number of times C(p,n) that said card has emitted said acoustic signals at a time of a current operation, and emitting from said card acoustic DTMF identification signals representing C(p,n), said acoustic identification signals being at least partly encrypted into a function S(p,n) as a function of C(p,n) and varying for each operation, when the customer uses said card, receiving said acoustic identification signals with a microphone of the telephone equipment and transmitting said acoustic identification signals through the communications network to computer, processing and electronically comparing said transmitted signals and the customer and card identifiers with the computer, and if after processing, said transmitted signals conform with said identifiers, connecting the customer to the service provider, wherein said computer stores a number of times C(p,m) that said card has been used at a time of a last validated operation, compares said number of times C(p,n) that said card has been used at the time of the current operation with said number of times C(p,m) that said card has been used at the time of the last validated operation, refuses the current operation if C(p,n) is less than or equal to C(p,m) and continues verifying the current operation if C(p,n) is greater than C(p,m), calculates electronic signals S'(p,n) as a function of said identifiers and the number of times C(p,n) that said card has been used at the time of the current operation, and compares said signals S'(p,n) with said signals S(p,n), and if said signals S'(p,n) conform with said signals S(p,n), connects the customer to the services.

2. The method according to claim 1, further comprising the following steps:

transmitting a pin code sent by the customer through said communications network to said computer, processing and comparing said transmitted pin code in said computer with a stored pin code.

3. The method according to claim 1, also comprising the following steps:

emitting from said card an encrypted acoustic validation signal, and recording said validation signal in said computer.

4. The method according to claim 3, also comprising the following step:

transmitting an acknowledgment of said validation signal to the customer.

5. System enabling a call control center to which services offered by separate service providers are related to identify the service provider's customers calling the call control center through telephone equipment connected to a communications network, the system comprising:

a card the same size as a credit card, said card being customized by identifiers specific to each card and to each customer, and provided to customers; said card comprising:

emission means for emitting acoustic DTMF identification signals, said emission means being activatable by the customer with an activation element accessible from an outside of said card, encryption means for at least partly encrypting said acoustic signals and varying said acoustic signals each time said signals are emitted, an incremental counter interconnected to said emission means and said encryption means such that said acoustic identification signals are encrypted as a function of a state of said incremental counter, said incremental counter being incremented by at least one unit whenever said card emits said acoustic signals, a microphone in said telephone equipment for receiving said acoustic signals and transforming said acoustic signals into electronic signals that can be transmitted through the communications network, computer means connected to said communications network, said computer means comprising:

a database containing said identifiers specific to each said card and each said customer, means for storing a state C(p,m) of said incremental counter at a time of a last validated operation, means for comparing a state C(p,n) of said incremental counter emitted during a current operation with said state C(p,m) of said incremental counter, such that said computer means refuses the current operation if C(p,n) is less than or equal to C(p,m), and continues the current operation of C(p,n) is greater than C(p,m), said processing means and said comparison means including means for calculating expected electronic signals S'(p,n) as a function of said state C(p,n) of said incremental counter and said identifiers, and comparing said expected electronic signals with said transmitted electronic signals, wherein said acoustic signals are at least partly encrypted into a function S(p,n) as a function of C(p,n), and wherein if said transmitted electronic signals S(p,n) conform with said expected electronic signals S'(p,n), the customers may then be connected to the service provider.

6. The system according to claim 5, said computer means also comprising means for comparing a customer's pin code contained in said database with a pin code sent by the customer and transmitted to said computer means through said communications network.

7. The system according to claim 5, said card also emitting an encrypted acoustic validation signal, said computer means also comprising:

means for detecting and recording said validation signal.

8. The system according to claim 7, said means for detecting and recording said validation signal comprise means for printing an acknowledgment.

* * * * *